United States Patent [19]

Nakajima et al.

[11] Patent Number: 4,603,180
[45] Date of Patent: Jul. 29, 1986

[54] THERMOSETTING RESIN COMPOSITION

[75] Inventors: Hiroyuki Nakajima, Suita; Fumiyuki Miyamoto, Itami; Masakazu Murayama, Takatsuki; Seiji Oka, Amagasaki; Eiki Jidai, Toyonaka, all of Japan

[73] Assignee: Mitsubishi Denki Kabushiki Kaisha, Tokyo, Japan

[21] Appl. No.: 746,121

[22] Filed: Jun. 18, 1985

[30] Foreign Application Priority Data

Jun. 29, 1984 [JP] Japan .................. 59-132869

[51] Int. Cl.$^4$ .................. C08G 59/14; C08L 63/10
[52] U.S. Cl. .................. 525/526; 525/529; 525/930
[58] Field of Search .................. 525/526, 930, 529

[56] References Cited

FOREIGN PATENT DOCUMENTS

| | | | |
|---|---|---|---|
| 2414876 | 10/1974 | Fed. Rep. of Germany | 525/529 |
| 56-38710 | 4/1981 | Japan | 525/529 |
| 57-55918 | 4/1982 | Japan | 525/529 |

*Primary Examiner*—Allan M. Lieberman
*Assistant Examiner*—Robert E. L. Sellers, II
*Attorney, Agent, or Firm*—Oblon, Fisher, Spivak, McClelland & Maier

[57] ABSTRACT

A thermosetting resin composition, consists essentially of:
(a) 100 parts by weight of a mixture of liquid acid anhydride and an imide ring-containing epoxy compound obtained from reaction of an epoxy compound having in one molecule thereof at least two epoxy groups and either one or both of imide ring-containing dicarboxylic acid compounds represented by the following general formulae (I) and (II):

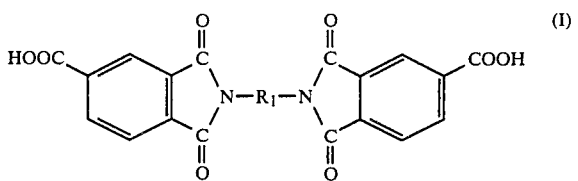

(where: $R_1$ is a divalent organic radical)

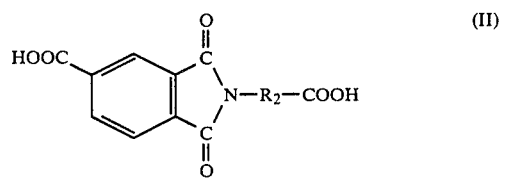

(where: $R_2$ is a divalent organic radical):
(b) 5 to 200 parts by weight of a tri-functional vinyl monomer; and
(c) 0.1 to 10 parts by weight of phenoxy resin.

3 Claims, No Drawings

THERMOSETTING RESIN COMPOSITION

BACKGROUND OF THE INVENTION

1. Field of the Invention

This invention relates to a novel thermosetting resin composition, and, more particularly, it is concerned with a thermosetting resin composition prepared by mixing a tri-functional vinyl monomer to an imide ring-containing epoxy compound with further addition of phenoxy resin and a liquid cyclic acid anhydride as an epoxy curing agent, the resin composition having a low viscosity and a long pot life, and the cured substance thereof having excellent mechanical and electrical characteristics.

2. Description of the Prior Art

There have so far been made numerous patent applications for inventions concerning the thermosetting resin compositions, many of which have been used for manufacture of actual machinery and tools.

However, most of these thermosetting resin compositions are of high viscosity at a room temperature and of a short pot life. For the purpose of lowering the viscosity, addition of a diluent is a generally adopted metheod; however, many of ordinary diluents are highly irritating to skin and are also liable to invite lowering in its characteristics, and its cured substance mostly indicates poor characteristics.

SUMMARY OF THE INVENTION

In view of such actual situations as mentionaed above, the present inventors conducted strenuously their studies and researches for obtaining an improved thermosetting resin composition free from the above-mentioned disadvantages, as the result of which they have arrived at the present invention.

It is therefore a primary object of the present invention to provide a thermosetting resin composition having a low viscosity, a long pot life, and an excellent curing property.

According to the present invention, in general aspect of it, there is provided a thermosetting resin composition which is characterized by mixing 5 to 200 parts by weight of a tri-functional vinyl monomer and 0.1 to 10 parts by weight of phenoxy resin with respect to 100 parts by weight of a mixture of liquid acid anhydride and an imide ring-containing epoxy compound to be obtained by reacting an epoxy compound having in one molecule thereof at least two epoxy groups and either one or both of imide ring-containing dicarboxylic acid compounds represented by the following general formulae (I) and (II):

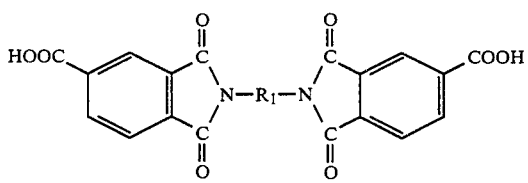

(where: $R_1$ is a divalent organic radical)

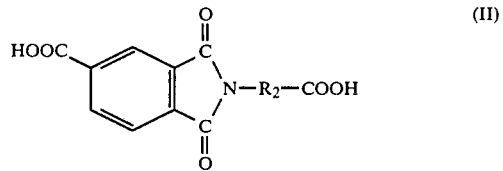

(where: $R_2$ is a divalent organic radical).

DETAILED DESCRIPTION OF THE INVENTION

The foregoing object, other objects as well as specific ingredients for use in this thermosetting resin composition and the method for its manufacture will become more apparent and understandable from the following detailed description thereof with several preferred examples thereof.

As the characteristic feature of the present invention, there may first be mentioned improved heat-resistant property of the thermosetting resin composition, which is realized by use of an imide ring-containing epoxy compound (imide-epoxy compound) having therein a highly heat-resistive imide ring, as the epoxy component. Further characteristic feature of the present invention resides in that a tri-functional vinyl monomer is mixed with the imide-epoxy compound to uniformly disperse with good compatibility the epoxy cured network and the vinyl cross-linked network, both of which are not reactive each other, thereby causing the advantage of the epoxy type resin such as flexibility, dimensional stability, etc. and the effect of the tri-functional vinyl type resin to increase the heat-deforming temperature to stand together, from which a cured substance of well-balanced properties can be obtained. Still further, the characteristic feature of the present invention resides in that, by inclusion into this resin composition of phenoxy resin having a high molecular weight, as a non-crosslinkable linear component, so as to disperse the same in the cross-linked network, the resin is imparted, with flexibility, and, at the same time, its adhesive strength is also improved.

The imide ring-containing dicarboxylic acid compounds (I) and (II) for use in the present invention may be obtained by the following methods.

Firstly, the imide ring-containing dicarboxylic acid compound represented by the following general formula (I) may be obtained from reaction of trimellitic acid and a fatty or aromatic diamine.

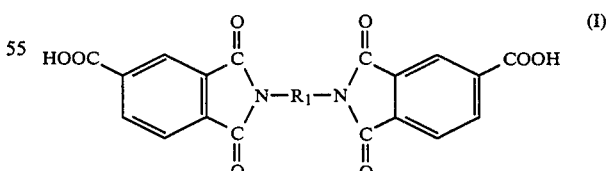

(where: $R_1$ is a divalent organic radical).

Examples of the fatty or aromatic diamines are: hexamethylenediamine, diaminodiphenylmethane, diaminodiphenylether, diaminodipheylsulfone, isophoronediamine, diaminobenzanilide, and so forth. By the way, the symbol $R_1$ in the above-described general formula (I) is a divalent organic radical, for which

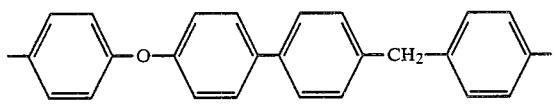

and so on may be used, as an example.

Secondly, the imide ring-containing dicarboxylic acid compound represented by the following general formula (II) may be obtained by reacting trimellitic acid and a fatty or aromatic aminocarboxylic acid.

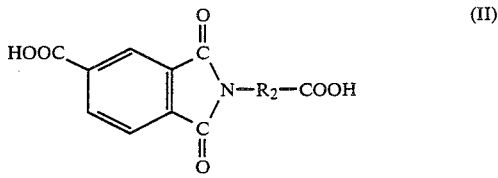

(where: $R_2$ is a divalent organic radical).

As the fatty or aromatic aminocarboxylic acid, there may be exemplified: glycine, m-aminobenzoic acid, p-aminobenzoic acid, and so forth. By the way, the symbol $R_2$ in the general formula (II) represents a divalent organic radical, for which

and others may be used, as an example.

Moreover, as the epoxy compound to be used in the present invention, there may be enumerated, as examples, diglycidyl ether type epoxy compounds such as "EPICOTE 828" (a trade name for a product of Shell Chemical Co.), "DER-332" (a trade name for a product of Dow Chemical Co.), and "GY-255" (a trade name for a product of Ciba-Geigy Co.); novolac type epoxy compounds such as "DEN 431" (a trade name for a product of Dow Chemical Co.); and alicyclic type epoxy compound such as "CY-179" (a trade name for a product of Ciba-Geigy Co.), and others.

The imide ring-containing dicarboxylic acid compound and the epoxy compound usually react each other at a temperature ranging from 80° C. to 200° C. in either presence or absence of a catalyst to produce the imide-epoxy compound.

As the cyclic acid anhydride which can be used in the present invention, there may be exemplified methyltetrahydrophthalic anhydride ("HN-2200"—a trade name for a product of Hitachi Kasei Kogyo K.K., Japan), methylhexahydrophthalic anhydride ("HN-5500"—a trade name for a product of Hitachi Kasei Kogyo K.K., Japan), methyl and methylene tetrahydrophthalic anhydride ("METHYLHYMIC ANHYDRIDE"—a product of Hitachi Kasei Kogyo K.K., Japan), and so forth.

As the tri-functional vinyl menomer which can be used in the present invention, there may be enumerated, for example: triallyltrimellitate, triallylisocyanurate, trimethylolpropane tri(meth)acrylate, trihydroxyethyl isocyanurate tri(meth)acrylate, and so forth.

It is desirable that the tri-functional vinyl monomer in one molecule be mixed in a quantity ranging from 5 to 200 parts by weight with respect to 100 parts by weight of the imide-epoxy compound. When the mixing quantity of the tri-functional vinyl monomer does not reach 5 parts by weight, the effect of addition of the vinyl compound (i.e., increase in the glass transition point ($T_g$) of the resin composition due to increase in the cross-linking density) cannot be obtained. On the contrary, when the mixing quantity exceeds 200 parts by weight, the shrinkage factor due to curing of the imide-epoxy compound becomes excessively large, whereby the properties of the resin become poor.

The phenoxy resin to be used for the present invention should preferably have its molecular weight in a range of from 15,000 to 60,000, and be mixed at a rate of from 0.1 to 10 parts by weight with respect to 100 parts by weight of the imide-epoxy compound. When the mixing quantity does not reach 0.1 part by weight, the flexibility imparting effect and the effect of improving its adhesive property are not satisfactory, and, when the mixing quantity exceeds 10 parts by weight, the viscosity of the resin composition becomes too high, which is not preferable from the practical standpoint.

The liquid cyclic acid anhydride should preferable be mixed at a rate of from 50 to 150 parts by weight with respect to 100 parts by weight of the imide-epoxy compound. When the mixing quantity does not reach 50 parts by weight, the crosslinking is not effected satisfactorily to thereby invite lowering in its properties. On the contrary, when its mixing quantity exceeds 150 parts by weight, the acid anhydride remains unreacted, which also invites lowering in its properties unfavorably.

For the purpose of accelerating the reaction of the thermosetting resin composition according to the present invention, addition of a catalyst is effective. As the catalyst for accelerating the reaction of the epoxy compound and the acid anhydride, there may be enumerated, as examples, various organic metal salts such as cobalt acetylacetonate, chromium acetylacetonate, zinc octylate, tin octylate, and so forth; imidazoles; Lewis acids and their amine salts such as $BF_3$, $BCl_3$, and so forth.

Furthermore, for the purpose of accelerating the vinyl polymerization, there may also be used vinyl polymerization initiating catalysts such as dicumyl peroxide, benzoyl peroxide, p-t-butylhydroperoxide, azo-bis-isobutyronitrile, and others.

For the purpose of lowering viscosity of the thermosetting resin composition according to the present invention, it may also be feasible that a vinyl monomer containing two or less number of vinyl group in one molecule thereof is mixed at a rate not exceeding 200 parts by weight with respect to 100 parts by weight of the imide-epoxy compound. Examples of the vinyl monomer are styrene, vinyl toluene, a-methyl styrene, acrylonitrile, N-vinyl pyrrolidone, bisphenol-A, diglycidylether di(meth)acrylate, and so forth. When this vinyl monomer is mixed in a quantity exceeding 200 parts by weight, various properties of the imide epoxy compound become poor, even though its viscosity may be sufficiently lowered.

The thermosetting resin composition of the present invention to be obtained in the above-described manner is not only of low viscosity and excellent in its impregnating property, but also results in a cured substance which is excellent in its electrical and mechanical characteristics.

With a view to enabling those persons skilled in the art to put the present inveniton into practice in a proper manner, the following preferred examples of the thermosetting resin composition are presented.

EXAMPLE 1

Imide-epoxy compound was obtained by adding 350 g (1 mol) of "DER 332" (a trade name for a product of Dow Chemical Co.) to 54.8 g (0.1 mol) of an imide ring-containing dicarboxylic acid compound of the following formula, and then causing the materials to react for two hours at 150° C.

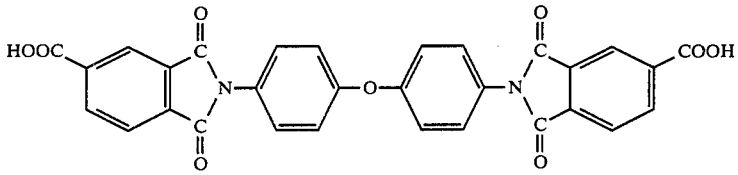

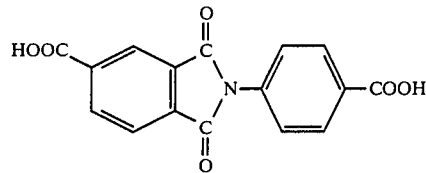

To 100 parts by weight of this imide-epoxy compound, there were added 5 parts by weight of trimethylolpropane triacrylate, 0.1 part by weight of phenoxy resin having a molecular weight of about 30000, 66 parts by weight of HN-2200 (a trade name for a product of Hitachi Kasei Kogyo K.K., Japan), 50 parts by weight of styrene, 0.2 part by weight of dicumyl peroxide as the catalyst, and 0.2 part by weight of zinc octylate, thereby manufacturing a thermosetting resin composition.

The initial viscosity of this resin composition was 120 cp. at 25° C. The pot life of this resin composition was measured by leaving it in an air-conditioned vessel maintained at a temperature of 25° C. and a relative humidity of 35% and periodically measuring its viscosity, the number of days taken for the resin composition to reach its viscosity of 400 cp. having been made its pot life. As the result of this, the resin composition indicated its pot life of six months or longer.

Subsequently, this resin composition was subjected to curing under heat first at a temperature of 110° C. for six hours, and then at 150° C. for 16 hours, thereby obtaining a cured substance. This cured substance showed its bending strength of 12 kg/mm² at 25° C. (in accordance with JIS K-6911), its weight decrease after 16 days of continued heating at 180° C. of 2.0% (in accordance with JIS C-2103), and its dielectric dissipation factor of 1% or lower at 100° C. (in accordance with JIS C-2103), all these numerical values exhibiting favorable characteristics of this resin composition. Further, the skin irritating test revealed that no change whatsoever on the part of the skin as tested was observed.

EXAMPLE 2

Imide-epoxy compound was obtained by adding 760 g (2.0 mol) of "EPICOTE 828" (a trade name for a product of Shell Chemical Co.) to 31.1 g (0.1 mol) of an imide ring-containing dicarboxylic acid compound of the following formula, and then causing the materials to react for two hours at 150° C.

To 100 parts by weight of this imide-epoxy compound, there were added 180 parts by weight of trihydroxyethylisocyanurate triacrylate, 8 parts by weight of phenoxy resin having a molecular weight of about 30,000, 73 parts by weight of "HN-5500", 50 parts by weight of vinyl toluene, 0.3 part by weight of di-t-butyl hydroperoxide as the catalyst, and 0.2 part by weight of cobalt acetylacetonate, thereby manufacturing a thermosetting resin composition.

The initial viscosity of this resin composition was 150 cp. at 25° C. As the result of measuring the pot life of this resin composition in the same manner as in Example 1 above, it indicated six months or longer.

Subsequently, this resin composition was subjected to curing under heat first at a temperature of 120° C. for six hours, and then at 150° C. for 16 hours, thereby obtaining a cured substance. This cured substance showed its bending strength of 11 kg/mm² at 25° C. (in accordance with JIS K-6911), its weight decrease after 16 days of continued heating at 180° C. of 1.0% (in accordance with JIS C-2103), and its dielectric dissipation factor of 1% or lower at 100° C. (in accordance with JIS C-2103), all these numerical values exhibiting favorable characteristics of this resin composition.

EXAMPLE 3

Imide-epoxy compound was obtained by adding 1.050 g (3 mol) of "GY-255" (a trade name for a product of Chiba-Geigy Co.) to 54.6 g (0.1 mol) of an imide ring-containing dicarboxylic acid compound of the following formula, and then causing the materials to react for two hours at 150° C.

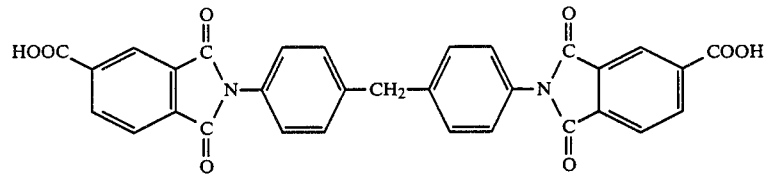

To 100 parts by weight of this imide-epoxy compound, there were added 20 parts by weight of trihydroxyethyl isocyanurate trimethacrylate, 20 parts by weight of triallyltrimellitate, 0.2 part by weight of phenoxy resin having a molecular weight of about 30,000, 90 parts by weight of "METHLYLHYMIC ANHYDRIDE" (a trade name for a product of Hitachi Kasei Kogyo K.K., Japan), 0.5 part by weight of dicumyl peroxide as the catalyst, and 0.2 part by weight of BF₃- monoethylamine complex, thereby manufacturing a thermosetting resin composition.

The initial viscosity of this resin composition was 120 cp. at 25° C. As the result of measuring the pot life of this resin composition in the same manner as in Example 1 above, it indicated six months or longer.

Subsequently, this resin composition was subjected to curing under heat first at a temperature of 120° C. for six hours, and then at 150° C. for 16 hours, thereby obtaining a cured substance. This cured substance showed its bending strength of 11.5 kg/mm² at 25° C. (in accordance with JIS K-6911), its weight decrease after 16 days of continued heating at 180° C. of 2.0% (in accordance with JIS C-2103) and its dielectric dissipation factor of 1% or lower at 100° C. (in accordance with JIS C-2103), all these numerical values exhibiting favorable characteristics of this resin composition.

EXAMPLE 4

Imide-epoxy compound was obtained by adding 875 g (25 mol) of "DER 332" (a trade name for a product of Dow Chemical Co.) to 54.6 g (0.1 mol) of an imide ring-containing dicarboxylic acid compound of the following formula, and then causing the materials to react for two hours at 150° C.

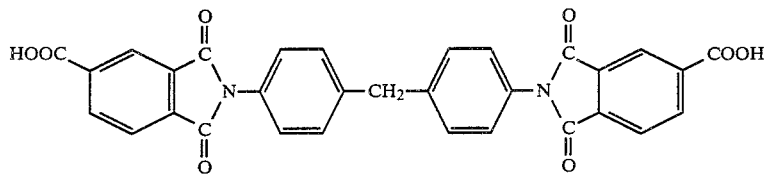

To 100 parts by weight of this imide-epoxy compound, there were added 20 parts by weight of trimethylolpropane triacrylate, 100 parts by weight of styrene, 0.5 part by weight of phenoxy resin having a molecular weight of about 30000, 85 parts by weight of "HN-2200" (a trade name for a product of Hitachi Kasei Kogyo K.K., Japan), 0.3 part by weight of dicumyl peroxide as the catalyst, and 0.2 part by weight of BF₃-monoethylamine complex, thereby manufacturing a thermosetting resin composition.

The initial viscosity of this resin composition was 60 cp. at 25° C. As the result of measuring the pot life of this resin composition in the same manner as in Example 1 above, it indicated six months or longer.

Subsequently, this resin composition was subjected to curing under heat first at a temperature of 120° C. for six hours, and then at 150° C. for 16 hours, thereby obtaining a cured substance. This cured substance showed its bending strength of 11.0 kg/mm² at 25° C. (JIS K-6911), its weight decrease after 16 days of continued heating at 180° C. of 3.0% (in accordance with JIS C-2103), and its dielectric dissipation factor of 1% or lower at 100° C. (in accordance with JIS C-2103), all these numerical values exhibiting favorable characteristics of this resin composition.

COMPARATIVE EXAMPLE 1

To 100 parts by weight of "EPICOTE 828", there were added 85 parts by weight of HN-2200 and 0.3 part by weight of benzyldimethylamine as the catalyst, thereby manufacturing an impregnating resin composition.

This resin composition indicated its viscosity as high as 600 cp. at 25° C., hence it required heating for its use at the viscosity of 400 cp. or below. Further, its pot life at 40° C. was shorter than one month.

COMPARATIVE EXAMPLE 2

To 100 parts by weight of "EPICOTE 828", there was mixed 85 parts by weight of "HN-2200" with further addition of 20 parts by weight of phenyl glycidylether and 0.3 part by weight of benzyl dimethylamine, thereby manufacturing an impregnating resin composition.

This resin composition showed its initial viscosity of 150 cp. at 25° C., and its pot life measured by the same method as in Example 1 above was shorter than one month.

Also, this resin composition was cured under heat of 150° C. for 16 hours to obtain a cured substance. This cured substance showed its bending strength of 9 kg/mm² at 25° C. (in accordance with JIS K-6911), its weight decrease after 16 days of continued heating at 180° C. of as high as 8% (in accordance with JIS C-2103) and its dielectric dissipation factor of 3% and higher at 100° C. (in accordance with JIS C-2103). Thus, the resin composition of this comparative example indicated only poorer characteristics than those in the foregoing exmaples.

COMPARATIVE EXAMPLE 3

Imide-epoxy compound was obtained by adding 760 g (2.0 mol) of "EPICOTE 828" (a trade name for a product of Shell Chemical Co.) to 31.1 g (0.1 mol) of an imide ring-containing dicarboxylic acid compound of the following formula, and then causing the materials to react for two hours at a temperature of 150° C.

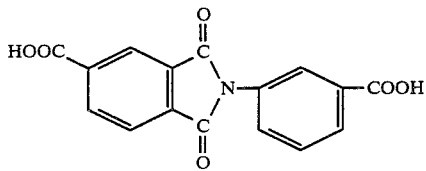

Using the thus-obtained imide-epoxy compound, the resin composition of the exactly same composition as in Example 2 above was manufactured with the exception that the quantity of vinyl toluene was increased to 300 parts by weight.

This resin composition indicated its initial viscosity of as low as 40 cp. at 25° C. Although it had the pot life of six months or longer, the cured substance obtained by heating the resin composition first at 120° C. for six hours and then at 150° C. for 16 hours exhibited only poorer properties than those of the cured substance of the resin composition obtained in Example 2 above, i.e., the bending strength of 8 kg/mm² (in accordance with JIS K-6911); the weight decrease after 16 days of continued heating at 180° C. of 5% (in accordance with JIS C-2103); and the dielectric dissipation factor of 3% and above at 100° C. (in accordance with JIS C-2103).

As described in the foregoing, the present invention possesses the effect of giving the cured substance having a low viscosity, a long pot life, and excellent electrical and mechanical characteristics.

Although, in the foregoing, the present invention has been described with reference to several preferred examples thereof in connection with comparative examples for exhibiting superiority of the resin composition according to the present invention, it should be noted that the these examples are illustrative only and not so restrictive, and that any changes and modifications may be made in the ingredients used and manufacturing conditions by those persons skilled in the art without departing from the spirit and scope of the invention as set forth in the appended claims.

What is claimed is:

1. A thermosetting resin composition, consisting essentially of:

(a) 100 parts by weight of a mixture of liquid acid anhydride and an imide ring-containing epoxy compound obtained from reaction of an epoxy compound having in one molecule thereof at least two epoxy groups and either one or both of imide ring-containing dicarboxylic acid compounds represented by the following general formulae (I) and (II):

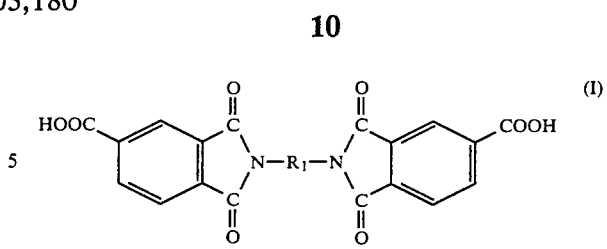

(where: $R_1$ is a divalent organic radical)

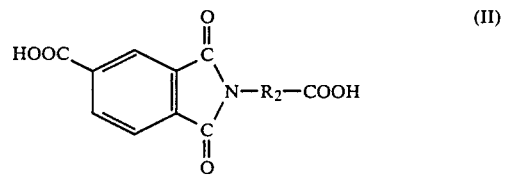

(where: $R_2$ is a divalent organic radical):

(b) 5 to 200 parts by weight of a tri-functional vinyl monomer; and
    (c) 0.1 to 10 parts by weight of phenoxy resin.

2. A thermosetting resin composition according to claim 1, wherein a vinyl monomer having a single vinyl group in one molecule thereof is mixed in a range not exceeding 200 parts by weight with respect to 100 parts by weight of said imide ring-containing epoxy compound.

3. A thermosetting resin composition according to claim 1 or 2, wherein the molecular weight of said phenoxy resin ranges from 15,000 to 60,000.

* * * * *